United States Patent [19]

Afman

[11] Patent Number: 5,567,460
[45] Date of Patent: Oct. 22, 1996

[54] METHOD OF PREPARING FULLY COOKED BACON DERIVED FROM PORK BELLIES

[75] Inventor: Brent J. Afman, Munster, Ind.

[73] Assignee: OSI Industries, Inc., Aurora, Ill.

[21] Appl. No.: 437,445

[22] Filed: May 4, 1995

[51] Int. Cl.⁶ ............................ A23L 1/314; A23L 1/318
[52] U.S. Cl. ...................... 426/264; 426/281; 426/412
[58] Field of Search ..................................... 426/243, 281, 426/641, 264, 645, 412, 413, 513, 519

[56] References Cited

U.S. PATENT DOCUMENTS

| | | | |
|---|---|---|---|
| 2,974,047 | 3/1961 | Holmes | 426/264 |
| 3,595,679 | 7/1971 | Schoch et al. | 426/281 X |
| 3,674,504 | 7/1972 | Lane | 426/243 |
| 3,741,777 | 6/1973 | Wrobel et al. | 426/281 |
| 3,906,115 | 9/1975 | Jeppson | 426/243 |
| 4,029,824 | 6/1977 | Langen | 426/281 |
| 4,038,426 | 7/1977 | Jespersen et al. | 426/281 X |
| 4,547,379 | 10/1985 | Moller et al. | 426/281 |
| 4,871,561 | 10/1989 | Parker . | |
| 4,879,128 | 11/1989 | Morin et al. | 426/243 X |
| 4,954,356 | 9/1990 | Kappes | 426/243 X |

FOREIGN PATENT DOCUMENTS 2716425  10/1978  Germany ............................ 426/281

*Primary Examiner*—Arthur L. Corbin
*Attorney, Agent, or Firm*—Wallenstein & Wagner, Ltd.

[57] ABSTRACT

Methods of curing and processing pork bellies into fully cooked bacon have been developed that eliminates the need for smokehouse treatment with a dramatic reduction in processing time and cost. The methods of the present invention employ a single cooking step that both fully cooks a pickle solution infused pork belly and achieves the necessary weight reduction to meet the regulatory product definition for fully cooked bacon. The methods of the present invention may be employed for either strip form or circular form bacon.

16 Claims, No Drawings

METHOD OF PREPARING FULLY COOKED BACON DERIVED FROM PORK BELLIES

TECHNICAL FIELD

The present invention generally relates to curing and processing pork bellies to produce bacon and, in particular, to a novel method of processing pork bellies into fully cooked bacon without need of smokehouse treatment.

BACKGROUND OF THE INVENTION

The term "bacon" broadly defines a category of cured and processed pork bellies. Most commonly, pork bellies are cured and processed into strip form bacon or circular form. The weight and yield of bacon is precisely defined by federal regulation. For example, for cured pork bellies to be labelled as "fresh" bacon, i.e. uncooked, the cured pork bellies must have a weight not exceeding the weight of uncured pork bellies. Similarly, for cured pork bellies to be labelled as "cooked" or "precooked" bacon, the cured pork bellies must have a yield not more than 40% the weight of uncured pork bellies, i.e. 60% shrinkage from the initial weight of the pork belly, also known as the "green weight" is required.

The traditional process of curing pork bellies to create a bacon product entails the infusion of a liquid pickle solution into the pork bellies. Infusion of the pickle solution creates an infusion weight that exceeds green weight. Depending on manufacturing capabilities and customer preference, infusion weight may be anywhere from 105% to 115% of green weight. To meet the regulatory product definitions of either fresh or cooked bacon, a degree of weight loss must occur equal to or greater than the added weight of the injected pickle solution, i.e. the finished weight must be equal to or less than the meat portion prior to the injection of the pickle solution. Hence, to obtain the necessary weight reduction to meet the regulatory product definitions for bacon, the prior art has subjected the infused pork bellies to a prolonged low temperature cook cycle.

Historically, this slow cooking took place in smokehouses which achieved the necessary weight reduction and also imparted a smoke flavor characteristic of bacon. Modern techniques employ cooking ovens which heat the product to a core temperature of 140° F. during a 4 to 5 hour cook cycle. This slow, low temperature heating produces a 10%–15% loss of injected weight without reaching temperatures to fully cook the pork bellies. The "smokehouse" treatment cooks-off the liquid portion of the pickle solution leaving behind the seasoning carried in the liquid thus curing the pork bellies and imparting the characteristic bacon taste. After the smokehouse treatment, the cured pork bellies are substantially fluid free.

Because of the use of modern slow cooking ovens, the smoke flavor is now produced in different ways. For circular bacon, created by two individual pork bellies cold formed together and encased within a sausage-style casing, a smoke flavoring agent is added to the pickle solution. With strip bacon, the entire pork belly may also be subject to an atomized spray of smoke flavoring agent within the cooking chamber of the oven.

For fresh bacon, the "smokehouse" treatment causes adequate weight reduction to return the cured pork belly to green weight and therefore within the regulatory product definition for fresh bacon. After the smokehouse treatment, cured pork bellies intended to be sold as fresh bacon are weighed to assure the necessary loss of 10% weight from infused weight. Next, the internal temperatures of the cured pork bellies are chilled from 140° F. to 30° F. to facilitate slicing. The product is sliced and then packaged.

However, for fully cooked bacon, additional weight reduction of at least another 60% from green weight is necessary to bring the product with the regulatory definition for "cooked" bacon. After completion of the smokehouse treatment, cured pork bellies intended to be sold as cooked are weighed to assure loss of at least 10% weight from infused weight. Whether in circular form or strip form, the internal temperatures of the cured pork bellies are chilled from about 140° F. to 30° F. Again, such chilling is done to facilitate slicing. The bellies are sliced and then further cooked, typically in microwave ovens for about 1½ to 2 minutes depending on microwave amperage, conveyor belt speed through the microwave ovens and, the number of microwave cooking cavities being employed. Such further cooking causes the necessary 60% shrinkage to bring the cured and now fully cooked pork bellies with the regulatory definition for fully cooked bacon.

Hence, curing pork bellies intended as "fresh" bacon uses single step cooking employing solely the smokehouse treatment while cured pork bellies intended as "cooked" bacon uses a two step cooking employing both smokehouse treatment and a second cooking step, typically microwave cooking. The prior art teaches that smokehouse treatment was necessary for curing pork bellies whether they were intended to be sold as fresh or fully cooked bacon.

It is apparent from the above disclosure that smokehouse treatment is both time and energy intensive and contributes greatly to the cost of producing bacon. But with the market for fully cooked bacon product gaining in consumer popularity, prior to the development of the present invention, a need existed for methods to cure and process pork bellies into fully cooked bacon by reducing the costs and time associated with a two step cooking cycle and particularly with the smokehouse treatment.

SUMMARY OF THE INVENTION

According to the present invention, novel methods of curing and processing pork bellies into fully cooked bacon have been developed that eliminates the need for smokehouse treatment with a dramatic reduction in processing time and cost. Essentially, the methods of the present invention employ a single cooking step that both fully cooks a pickle solution infused pork belly and achieves the necessary weight reduction to meet the regulatory definition for fully cooked bacon. The methods of the present invention may be employed for either strip form or circular form bacon.

Generally, the methods of the present invention follow traditional curing methods by infusing the pork bellies with pickle solution to 105%–115% of green weight. But instead of then subjecting the infused pork bellies to smokehouse treatment to achieve at least a 10% weight reduction, the methods of the present invention eliminate smokehouse treatment. In complete deviation from the prior art, the infused pork bellies are rapidly chilled to temperatures below those commonly used to facilitate slicing. Specifically, the pickle solution infused pork bellies are chilled to between 22° F. and 25° F. In either strip form or circular form, the reduced temperatures render the pickle solution within the pork bellies into a semi-solid. This retains pickle solution within the pork bellies, preserves the compositional integrity of the product, and facilitates handling of individual pork belly slices prior to cooking. Such reduced chilling temperatures also have the effect of cold setting the individual pork bellies that comprise circular form bacon. Reduced temperature chilling of the pickle solution infused pork bellies also permits thinner slicing of product.

Also, in deviation from prior art techniques, the present invention reduces the thickness of the slices by about 5%. Reduced slicing allows for cooking cycles that unexpectedly are only slightly longer than the prior art second step cooking cycles which employ smokehouse treatment.

Further, even though the methods of the present invention eliminate smokehouse treatment and employing only a slightly longer single step cooking, a more than 60% shrinkage from infused weight results sufficient to meet the regulatory definition for fully cooked bacon. Yet, the methods of the present invention result in fully cooked product having the aroma, flavor, texture and appearance of fully cooked bacon produced by smokehouse treatment reduces curing and processing time by an estimated 30–35 hours resulting in dramatic savings.

Other advantages and aspects of the present invention will become apparent from the following detailed description of the invention.

DETAILED DESCRIPTION

While this invention is susceptible of embodiment in many different forms, there is herein described in detail preferred embodiments of the invention with the understanding that the present disclosure is to be considered as an exemplification of the principles of the invention and is not intended to limit the broad aspect of the invention to the embodiments illustrated.

The methods of the present invention are directed to curing and processing pork bellies to produce sliced fully cooked bacon in either strip form or circular form. By utilizing lower temperatures to chill pickle solution infused pork bellies, the liquid pickle solution is rendered a semi-solid and retained within the pork bellies. This both maintains compositional integrity of the product and permits slicing of the pork bellies into slices having a reduced thickness thus allowing for single step cooking.

The single step cooking cycle employed by the methods of the present invention are generally no more than about 15% longer than second step cooking cycles known in the art for producing fully cooked bacon. Yet, unexpectedly the single step cooking cycle of the present invention results in substantial shrinkage from infused weight to produce a fully cooked product meeting the regulatory definition for "cooked" bacon. Further, single step cooking, preferably by microwave or surface conduction cooking such as by heated conveyor belt surfaces, produces a fully cooked bacon product having all of the color, texture, aroma and flavor characteristic of fully cooked bacon. Hence, the methods of the present invention eliminate (1) smokehouse treatment (2) post-smokehouse weighing of product, and, (3) the need to chill smokehouse treated pork bellies from high internal meat temperatures of 140° F. to slicing temperatures of 30° F. The elimination of theses steps results in dramatic savings in processing times and costs.

The following Examples describe in more detail the methods of the present invention with reference to a preferred commercial processing operation for both sliced circular form and sliced strip form, fully cooked bacon.

EXAMPLE 1

COOKED CIRCULAR FORM SLICED BACON

Pork bellies of a selected weight and size are trimmed in the manner known in the art. Next, a seasoned pickle solution is injected into the trimmed pork bellies to preferably 110% of green weight using a multi-needle Formaco injector or such other injector known in the art. The seasoned pickle solution may have any composition known in the meat curing art. To impart a smoked flavor to the bacon, a smoke flavoring agent must be added to the pickle solution composition. The injected pork bellies are tumbled in a vacuum meat massager for a time period sufficient to enhance adhesion and bonding together of the pork bellies. Two pork bellies are rolled together and stuffed into a round, perforated casing. After casing the product is often referred to as "bacon log."

At this point, prior art techniques teach smokehouse treatment of the encased pork bellies. Instead, in accordance with the present invention, the encased pork bellies are chilled from temperatures of 35° F. to 40° F. (approximately ambient air temperature within a commercial packing plant) to no more than 25° F. and, preferably, with in the range of 22° F. to 25° F. It has been discovered that this temperature range both cold-sets together the individual pork bellies within the casings and cold-sets the pickle solution to thus retain the solution within the pork bellies by rendering the pickle solution a semi-solid.

The encased chilled pork bellies are then sliced to a thickness of generally 4–5% thinner than is used in most commercial embodiments. For example, with reference to the commercial processing operation herein described, bacon logs that have been subjected to smokehouse treatment are sliced to a thickness of 0.086±0.001 inch. By eliminating smokehouse treatment, original bacon log diameter is maintained and therefore slices can be achieved having an average thickness of 0.083±0.001 inch and yet meet customer specifications. Such reduced thickness of the slices facilitates the necessary shrinkage and complete cooking of the product.

The slices are then immediately transferred to a cooking device. This device may include a conveyor belt having a heat conductive surface (also known as "belt grilling") or, as preferably practiced, by passing the slices on a conveyor belt through one or more microwave cooking chambers. With reference to the preferred commercial operation herein described, a five cavity Ferrite™ microwave unit was employed. Each cavity is serviced by two transmitters and each set at maximum amperage setting levels of 4.20. This amperage setting achieves a temperature within each microwave cavity of about 220° F. Conveyor belt speeds had to be decreased from 600 inches/minute for sliced product that was subject to smokehouse treatment, to 550 inches/minute for sliced product processed according to the present invention. Decreased belt speed increased total dwell time within all microwave cooking cavities from approximately 1 minute, 10 seconds to 1 minute, 20 seconds, or about a 15% increase in dwell time.

Sliced product emerging from the microwave cooking chambers possessed the appearance, aroma, taste and texture of product processed according to the prior art two step cooking cycle.

EXAMPLE 2

COOKED STRIP FORM SLICED BACON

As disclosed above, pork bellies of a selected weight and size are trimmed in the manner known in the art. Next, a seasoned pickle solution is injected into the trimmed pork bellies to preferably 110% of green weight using a multi-needle Formaco injector or such other injector known in the art. The seasoned pickle solution may have any composition known in the meat curing art. Again a smoke flavoring agent must be added to the pickle solution.

The pork bellies are then chilled from temperatures of 35° F. to 40° F. to no more than 25° F. and preferably with in the range of 22° F. to 25° F. to cold-set and thereby retain the pickle solution within the pork bellies by rendering the pickle solution a semi-solid.

As described above, the chilled pork bellies are then sliced to a thickness of 4–5% less than the thickness for pork bellies that have been subjected to smokehouse treatment. Such reduced thickness of the slices facilitates the necessary shrinkage and complete cooking of the product.

As with sliced circular product, the slices are then immediately transferred to a cooking device. This device may include a conveyor belt having a heat conductive surface (also known as "belt grilling") or as preferably practiced, by passing the slices on a conveyor belt through one or more microwave cooking chambers and using the preferred amperage settings and dwell time as described above for sliced circular product. Sliced product emerging from the microwave cooking chambers possesses the appearance, aroma, taste and texture of product processed according to the prior art two step cooking cycle.

By eliminating the steps of (1) smokehouse treatment (2) post-smokehouse weighing of product, and, (3) the need to chill smokehouse treated pork bellies from internal meat temperatures of 140° F. to slicing temperatures of 30° F., the present invention achieves substantial reductions in cost and processing time for producing fully cooked bacon products. For example by eliminating the 4 to 5 hours necessary for smokehouse treatment, it has been estimated that substantial savings could be achieved in commercial scale production of fully cooked bacon products.

While the specific embodiments have been illustrated and described with reference to a preferred commercial operation, numerous modifications come to mind depending on the variables presented by other commercial operations, all without significantly departing from the spirit and intent of the invention. The scope of protection is only limited by the scope of the accompanying claims with reference to this specification.

I claim:

1. A method of curing and processing pork bellies to produce fully cooked sliced bacon using a single heating step and omitting any smokehouse treatment, consisting essentially of the steps of:

providing pork bellies having a preselected weight;

infusing the pork bellies with a seasoned liquid pickle solution;

chilling rapidly the pork bellies sufficient to render the seasoned pickle solution a semi-solid;

slicing the chilled pork bellies into a plurality of individual slices, heating rapidly the chilled slices with a heat source to a finished weight no more than 40% of the preselected weight; and, continuing heating with said heat source until the slices are fully cooked.

2. The method of claim 1 wherein the step of infusing further includes:

infusing the pork bellies with a seasoned liquid pickle solution to obtain an injected weight exceeding the preselected weight.

3. The method of claim 2 wherein the injected weight is within the range 105% to %115 of the preselected weight.

4. The method of claim 1 wherein the step of chilling includes chilling the pork bellies to between 22° F. to more than about 25° F.

5. The method of claim 1 wherein the pickle solution includes a flavoring agent for imparting a smoke taste to the pork bellies.

6. The method of claim 1 wherein the slices are of circular form or strip form.

7. The method of claim 1 wherein the steps of heating the slices includes:

passing the slices through a microwave cooking chamber.

8. A method of curing and processing pork bellies to produce circular sliced fully cooked bacon using a single heating step and omitting any smokehouse treatment, consisting essentially of the steps of:

providing pork bellies of a preselected weight;

infusing the pork bellies with a seasoned liquid pickle solution to obtain an injected weight exceeding the preselected weight;

tumbling the pork bellies to promote adhesion;

rolling together two pork bellies;

encasing the rolled pork bellies;

chilling rapidly the encased pork bellies to a temperature less than 25° F.;

slicing the chilled pork bellies into a plurality of individual circular slices;

exposing the chilled slices to a heat source to rapidly eliminate at least 60% of injected weight; and, cooking the slices with said heat source until the slices are fully cooked.

9. The method of claim 8 wherein the step of chilling includes chilling the pork bellies to between 22° F. to more than about 25° F.

10. The method of claim 8 wherein the pickle solution includes a flavoring agent for imparting a smoke taste to the pork bellies.

11. The method of claim 8 wherein the heating source includes a plurality of tandem arranged microwave cooking chambers.

12. A method of curing and processing pork bellies to produce strip sliced fully cooked bacon using a single heating step and omitting any smokehouse treatment, consisting essentially of the steps of:

providing pork bellies of a preselected weight;

infusing the pork bellies with a seasoned liquid pickle solution to obtain an injected weight exceeding the preselected weight;

chilling rapidly the pork bellies to a temperature less than 25° F.;

slicing the chilled pork bellies into a plurality of individual strip slices;

exposing the chilled slices to a heat source to rapidly eliminate at least 60% of injected weight; and, cooking the slices with said heat source until the slices are fully cooked.

13. The method of claim 12 wherein the step of chilling includes chilling the pork bellies to between 22° F. to more than about 25° F.

14. The method of claim 12 wherein the pickle solution includes a flavoring agent for imparting a smoke taste to the pork bellies.

15. The method of claim 12 wherein the heating source includes a plurality of tandem arranged microwave cooking chambers.

16. In a method of curing and processing pork bellies to produce fully cooked sliced bacon, the method including providing pork bellies having a preselected weight, and infusing the pork bellies with a seasoned liquid pickle solution, the improvement consisting essentially of the steps of:

cold setting the seasoned pickle solution within the pork bellies;

slicing the pork bellies into a plurality of individual slices;

heat reducing the slices with a heat source to a finished weight no more than 40% of the preselected weight; and, continuing heating of the slices with said heat source until the slices are fully cooked.

\* \* \* \* \*

REEXAMINATION CERTIFICATE (3357th)

United States Patent [19]

Afman

[11] B1 5,567,460

[45] Certificate Issued Oct. 14, 1997

[54] METHOD OF PREPARING FULLY COOKED BACON DERIVED FROM PORK BELLIES

[75] Inventor: Brent J. Afman, Munster, Ind.

[73] Assignee: OSI Industries, Inc., Aurora, Ill.

Reexamination Request:
No. 90/004,582, Mar. 17, 1997

Reexamination Certificate for:
Patent No.: 5,567,460
Issued: Oct. 22, 1996
Appl. No.: 437,445
Filed: May 4, 1995

[51] Int. Cl.⁶ .............................. A23L 1/314; A23L 1/318
[52] U.S. Cl. .................... 426/264; 426/281; 426/412
[58] Field of Search ................................. 426/243, 281, 426/641, 264, 645, 412, 413, 513, 519

[56] References Cited

U.S. PATENT DOCUMENTS 4,957,756  9/1990  Olander et al. ............................ 426/264

*Primary Examiner*—Arthur L. Corbin

[57] ABSTRACT

Methods of curing and processing pork bellies into fully cooked bacon have been developed that eliminates the need for smokehouse treatment with a dramatic reduction in processing time and cost. The methods of the present invention employ a single cooking step that both fully cooks a pickle solution infused pork belly and achieves the necessary weight reduction to meet the regulatory product definition for fully cooked bacon. The methods of the present invention may be employed for either strip form or circular form bacon.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–16 is confirmed.

* * * * *